US010821787B2

(12) United States Patent
Patel et al.

(10) Patent No.: US 10,821,787 B2
(45) Date of Patent: **\*Nov. 3, 2020**

(54) SYSTEMS AND METHODS FOR VEHICLE TPMS SENSOR CONTROL

(71) Applicant: Ford Global Technologies, LLC, Dearborn, MI (US)

(72) Inventors: Dilip B. Patel, Novi, MI (US); Ali Hassani, Ann Arbor, MI (US); John Robert Van Wiemeersch, Novi, MI (US)

(73) Assignee: Ford Global Technologies, LLC, Dearborn, MI (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/690,334

(22) Filed: Nov. 21, 2019

(65) Prior Publication Data

US 2020/0086696 A1 Mar. 19, 2020

Related U.S. Application Data

(63) Continuation of application No. 15/792,727, filed on Oct. 24, 2017, now Pat. No. 10,486,476.

(51) Int. Cl.
*B60C 23/04* (2006.01)
*B60C 23/00* (2006.01)

(52) U.S. Cl.
CPC ........ *B60C 23/0442* (2013.01); *B60C 23/009* (2013.01); *B60C 23/0405* (2013.01); *B60C 23/0416* (2013.01); *B60C 23/0457* (2013.01); *B60C 23/0471* (2013.01)

(58) Field of Classification Search
CPC ............ B60C 23/0442; B60C 23/0471; B60C 23/009; B60C 23/0457; B60C 23/0416; B60C 23/0405
See application file for complete search history.

(56) References Cited

U.S. PATENT DOCUMENTS

| 6,810,727 | B1 | 11/2004 | Davis et al. |
| 9,122,423 | B2 | 9/2015 | McIntyre et al. |
| 9,487,054 | B2 | 11/2016 | McIntyre et al. |
| 9,573,426 | B2 | 2/2017 | Wagner |
| 2010/0191409 | A1\* | 7/2010 | Weston ................. B60C 23/009 |
|  |  |  | 701/29.6 |

(Continued)

FOREIGN PATENT DOCUMENTS

| CN | 201161534 Y | 12/2008 |
| CN | 101423008 A | 5/2009 |
| CN | 105784272 A | 7/2016 |

*Primary Examiner* — Quan-Zhen Wang
*Assistant Examiner* — Rajsheed O Black-Childress
(74) *Attorney, Agent, or Firm* — Frank Lollo; Eversheds Sutherland (US) LLP

(57) ABSTRACT

Method and apparatus are disclosed for controlling a TPMS sensor of a vehicle tire. An example vehicle includes a communication module, a tire, and a TPMS sensor corresponding to the tire. The TPMS sensor is configured to receive a target pressure from the communication module, determine a modified target pressure based on vehicle data determined by a vehicle sensor, and, responsive to determining that a measured pressure differs from the modified target pressure by a threshold amount, transmit an alert to the communication module.

17 Claims, 4 Drawing Sheets

(56) References Cited

U.S. PATENT DOCUMENTS

| | | | |
|---|---|---|---|
| 2013/0009763 A1* | 1/2013 | Koga | B60C 23/0471 340/442 |
| 2014/0129076 A1* | 5/2014 | Mouchet | B60C 23/0479 701/29.3 |
| 2016/0347130 A1* | 12/2016 | Chan | B60C 23/003 |
| 2017/0028796 A1* | 2/2017 | Patel | B60C 23/0408 |

* cited by examiner

SYSTEMS AND METHODS FOR VEHICLE TPMS SENSOR CONTROL

CROSS-REFERENCE TO RELATED APPLICATIONS

The present disclosure claims priority to, the benefit of, and is a continuation of U.S. application Ser. No. 15/792,727, filed Oct. 24, 2017, which is hereby incorporated by reference herein in its entirety.

TECHNICAL FIELD

The present disclosure generally relates to vehicles with tire pressure monitoring system (TPMS) sensors and, more specifically, systems and methods for vehicle TPMS sensor control.

BACKGROUND

Vehicles have a tire pressure monitoring system (TPMS) with sensors monitoring each mounted tire and sometimes the spare. The TPMS sensors measure the pressure of the corresponding vehicle tire, and may transmit the measured pressure to the vehicle for display to a driver. The TPMS sensors may be located on the interior of the tire rim, and may transmit information at a slow rate to conserve battery life. Each tire may have a corresponding target pressure value, which may be a target pressure at which the tire is expected or intended to operate.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for controlling TPMS sensors of a vehicle. An example disclosed vehicle includes a communication module, a tire, and a TPMS sensor corresponding to the tire. The TPMS sensor is configured to receive a target pressure from the communication module, determine a modified target pressure based on vehicle data determined by a vehicle sensor, and responsive to determining that a measured pressure differs from the modified target pressure by a threshold amount, transmit an alert to the communication module.

An example disclosed method includes receiving, by a TPMS sensor from a communication module of a vehicle, a target pressure corresponding to a tire of the vehicle. The method also includes determining a modified target pressure based on vehicle data determined by a vehicle sensor. And the method further includes, responsive to determining that a measured pressure differs from the modified target pressure by a threshold amount, transmitting an alert from the TPMS sensor to the communication module.

A third example may include means for receiving, by a TPMS sensor, a target pressure corresponding to a tire of the vehicle. The third example may also include means for determining a modified target pressure based on vehicle data determined by a vehicle sensor. And the third example may further include means for, responsive to determining that a measured pressure differs from the modified target pressure by a threshold amount, transmitting an alert from the TPMS sensor.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
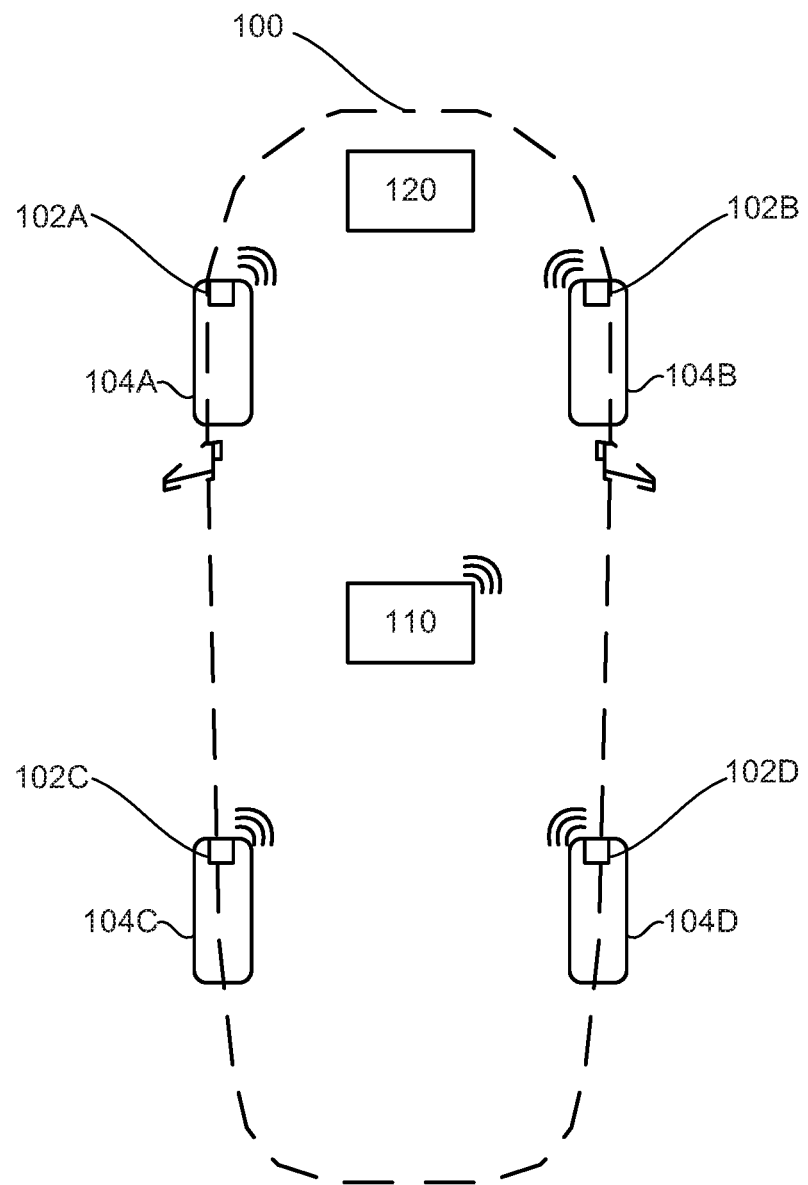
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, each tire of a vehicle may include a TPMS sensor. The TPMS sensors may provide tire pressure values of the respective tires. Further, each tire may have a particular target tire pressure value, or a value to which the tire is intended to be filled so that it can operate properly. This target value may be different for different tires, and may change based on one or more factors such as tire type, temperature, load on the tire, age of the tire, weather, selected driving mode, surfaces, etc.

TPMS sensors historically have only been able to transmit pressure values, and have generally not included processing capabilities that would allow the sensors to make complex determinations about the tire pressure, and whether or not the current measured pressure is acceptable. These sensors may not know what pressure range is considered optimal or acceptable for tire operation under varying conditions.

Further, historical sensors may be configured to broadcast the measured tire pressure frequently, so that the vehicle may know, without a long delay, when a tire is punctured, going flat, or otherwise has an issue. This can require a lot of power, and can subsequently reduce the useful life of the sensor and/or sensor battery. In addition, the constant transmission can cause interference within the transmission spectrum (e.g., BLUETOOTH), which is increasingly an issue with the prevalence of BLUETOOTH enabled devices and connectivity with vehicles. Further, historical sensors have generally not been able to dynamically account for changes in temperature, load, driving conditions, weather, etc.

With these issues in mind, example embodiments of the present disclosure may provide an improved TPMS sensor that is able to store a target tire pressure value. The TPMS sensor may then be able to measure a tire pressure value, and transmit an alert only when the measured value is outside a threshold range from the target value. In this way, the frequency of broadcast can be reduced and the useful life of the TPMS sensor and/or battery can be increased.

Further, examples disclosed herein may include the ability to account for vehicle conditions. One or more vehicle sensors may provide information to the TPMS sensor which can be used to modify the target pressure value. For instance, if it is known that a heavy load is being carried by the vehicle (and thus compressing the tire more than usual), the TPMS sensor may be configured to modify the target pressure upward. Then, if the measured pressure value is higher than usual (due to the tire compression), rather than sending an alert (as would normally be the case), the TPMS sensor may anticipate this increased pressure and may not send an alert if the increased pressure is within a threshold range of the modified target pressure. In this manner, the TPMS sensor may tailor or modify the target tire pressure based on the vehicle characteristics, such that alerts are transmitted only when there is truly an issue. That is to say, the range of tire pressures for which a given tire may operate can depend on the vehicle conditions. And the TPMS sensor may be configured to account for these vehicle conditions, and may modify the target pressure or target range of pressures accordingly.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 3).

As shown in FIG. 1, vehicle 100 may include a plurality of tires 104A-D each having a corresponding TPMS sensor 102A-D. Vehicle 100 may also include a communication module 110, and one or more vehicle sensors 120. One or more other electronic elements of vehicle 100 may be described in further detail with respect to FIG. 3.

TPMS sensors 102A-D may include circuitry configured to determine a tire pressure of a corresponding tire 104A-D. TPMS sensors 102A-D may also include circuitry to facilitate communication with one or more devices or systems, such as communication module 110 of vehicle 100 and/or mobile device (not shown). This communication may be done using any wireless protocol, including low frequency signals, high frequency, ultra high frequency (e.g., 315 MHz and/or 433 MHz), BLUETOOTH signals, and others. Further, TPMS sensors 102A-D may include one or more processors and/or memory that may enable the TPMS sensors to carry out one or more functions described herein. The processor may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory. The memory may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory, the computer readable medium, and/or within the processor during execution of the instructions.

Communication module 110 may be configured to communicate with one or more devices or systems of vehicle 100 (such as sensors, connected devices, etc.), as well as one or more remote devices or systems such as mobile device. Communication module 110 may include circuitry and/or components such that it may communicate via any wireless communication protocol, including low frequency, high frequency, BLUETOOTH, Ultra-Wide Band (UWB), WiFi, and others.

Communication module 110 may include one or more antennas. The antenna(s) individually and/or in combination may be configured to, among other things, (i) transmit and receive data from the plurality of tire pressure sensors, and (ii) transmit and received data from one or more vehicle sensors 120.

Each TPMS sensor 102A-D may be configured to receive a target pressure from the communication module 110. For example, the target tire pressure may be a tire pressure value particular to the tire type, size, age, material, etc. The target pressure may be a single value, or may be a range of values (e.g., between 30-35 PSI). And further, the target pressure may correspond to a value or range at which the tire is intended to operate. In some examples, this target value is called a "tire placard value."

In some examples, one or more tires may have a different target pressure. A given vehicle may include a first tire having a first target pressure, and a second tire having a second target pressure that is different from the first target pressure. The different target pressures may depend on the given tire's location on the vehicle (or a vehicle trailer if there is an attached trailer.) For instance, the front tires of a vehicle may have a different target pressure than the rear tires. And further, tires of a trailer pulled by the vehicle may still have a different target pressure.

The TPMS sensors 102A-D may also be configured to determine a modified target pressure based on vehicle data determined by a vehicle sensor. The vehicle sensors 120 may include one or more sensors configured to determine a vehicle temperature, ambient temperature, weather conditions, tire temperature, vehicle speed, acceleration, tire location on the vehicle (localization), the presence of a trailer, the weight of the trailer, a weight of the vehicle, and/or the force or weight imparted onto one or more of the tires 104A-D.

Data collected by the various vehicle sensors may be transmitted to the communication module 110. The communication module 110 may then transmit the data to one or more TPMS sensors 102A-D. The TPMS sensors may then apply a correction factor to the target pressure, based on the received data.

For instance, in one example the vehicle sensor comprises a temperature sensor. The TPMS sensor may then receive, from the communication module, a tire temperature value determined by the temperature sensor. If the tire temperature is higher than a threshold or baseline value, the target pressure may be increased. Further, the increase in the target pressure may correspond to a difference between the tire temperature and a baseline value, such that larger differences in temperature cause larger correction factors to be applied.

In another example, the vehicle sensor comprises a patch sensor coupled to one of the tires 104A-D, and the TPMS sensor corresponding to the tire is configured to receive, from the communication module, a load value of the tire determined by the patch sensor. The load value may be a weight imparted on the tire by the vehicle and any cargo being carried therein. A high load value may cause the TPMS sensor to apply a correction factor to the target pressure of the tire.

In the examples described above, the TPMS sensor is configured to receive data from the communication module 110 and/or vehicle sensors 120, and responsively modify the target pressure. Alternatively, the communication module and/or a vehicle processor may receive the vehicle sensor data and determine a corresponding modified target pressure. The modified target pressure may then be transmitted to the TPMS sensor.

In some examples, a plurality of tire pressures may be transmitted to the TPMS sensor, either by the communication module 110, or one or more other devices or systems. The TPMS sensor may then be configured to determine the modified target pressure of a given tire by selecting one of the plurality of tire pressure values. In this manner, the TPMS sensor may not apply a correction factor to the received target pressure, but may rather select a different tire pressure value from a list of tire pressure values.

The TPMS sensor may then be configured to transmit an alert to the communication module 110 responsive to determining that a measured pressure differs from the modified target pressure by a threshold amount. In some examples, the modified target pressure may be a range of pressure values. And determining that the measure pressure differs from the modified target pressure by a threshold amount can include determining that the measured pressure is outside the modified pressure range.

The measured pressure may fluctuate over time. However if the measured pressure is still within the modified target pressure range, no alert need be sent. As such, the battery life of the TPMS sensor may be conserved.

In some examples, a properly operating TPMS sensor in a properly operating tire of the present disclosure may not transmit an alert for a long period of time. This is due to the fact that the measured pressure remains within the threshold range or within a threshold range of the modified target pressure of the tire, such that the TPMS sensor has no reason to transmit an alert. But in these examples it may be difficult to detect the difference between a properly operating TPMS sensor that has not detected any problems, and a faulty TPMS sensor that cannot communicate. As such, some TPMS sensors of the present disclosure may include a "heartbeat" signal or transmission that is sent to the communication module, to indicate the health of the TPMS sensor. The heartbeat signal may provide a reliable indication that the TPMS sensor is operating properly, without requiring constant transmission by the TPMS sensor, or a high number of transmissions like typical TPMS sensors. In some examples the heartbeat signal may be transmitted once every six hours, twelve hours, or once per day. Other time intervals are possible as well.

In some examples the vehicle 100 may include a body control module. The body control module may be configured to receive, as input, one or more target tire pressures corresponding to one or more tires. The input may come from a driver of the vehicle via a vehicle user interface. Alternatively, the input may come from a manufacturer, dealership, or other party. The body control module of the vehicle 100 may be configured to automatically determine updated target pressure values for one or more tires, and transmit the updated target pressures to the TPMS sensors 102A-D via the communication module 110.

In some examples, a threshold difference between the measured pressure and a placard value may be set by a regulator or other authority, and any measured value outside that threshold must be reported or the driver must be alerted. This may also apply to changes in pressure over time. For instance, an regulation in some jurisdictions may require that any drop of 3 PSI in a specified time must be reported to the driver. Some examples disclosed herein may include modifying or setting the threshold value at which a notification must be provided based on the region, location, or other area in which the vehicle is sold or used. The threshold may further change based on driving conditions and speed.

Figure 2:
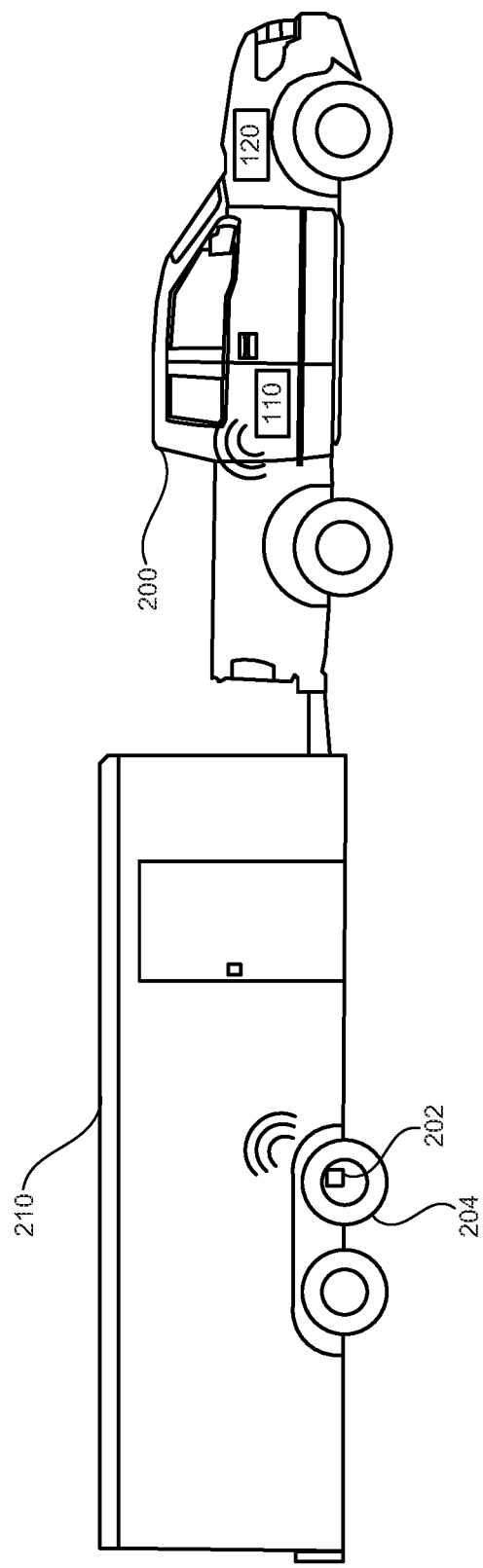
FIG. 2 illustrates a second example vehicle and trailer according to embodiments of the present disclosure.

FIG. 2 illustrates an example vehicle 200 having a trailer 210 attached thereto. Vehicle 200 may be similar or identical in some respects to vehicle 100 described herein. FIG. 2 shows that trailer 210 has one or more tires 204 with corresponding TPMS sensors 202. The tires 204 and the TPMS sensors 202 may be similar or identical to the tires 104A-D and TPMS sensors 102A-D described herein.

In some examples, one or more of the tires of the trailer may receive a target pressure prior to any communication with the communication module 110. For instance, the TPMS sensor 202 may receive a target pressure from a tire manufacturer, dealership, trailer rental outlet, or tire store. Similarly, in some examples, one or more of the TPMS sensors 102A-D of vehicle 100 may receive an initial target pressure value from a manufacturer, dealership, trailer rental outlet, or tire store. When the trailer 210 is coupled to the vehicle 200, the TPMS sensor 202 may then receive information and/or data from one or more vehicle sensors 120, which may be used to determine the modified target pressure.

Figure 3:
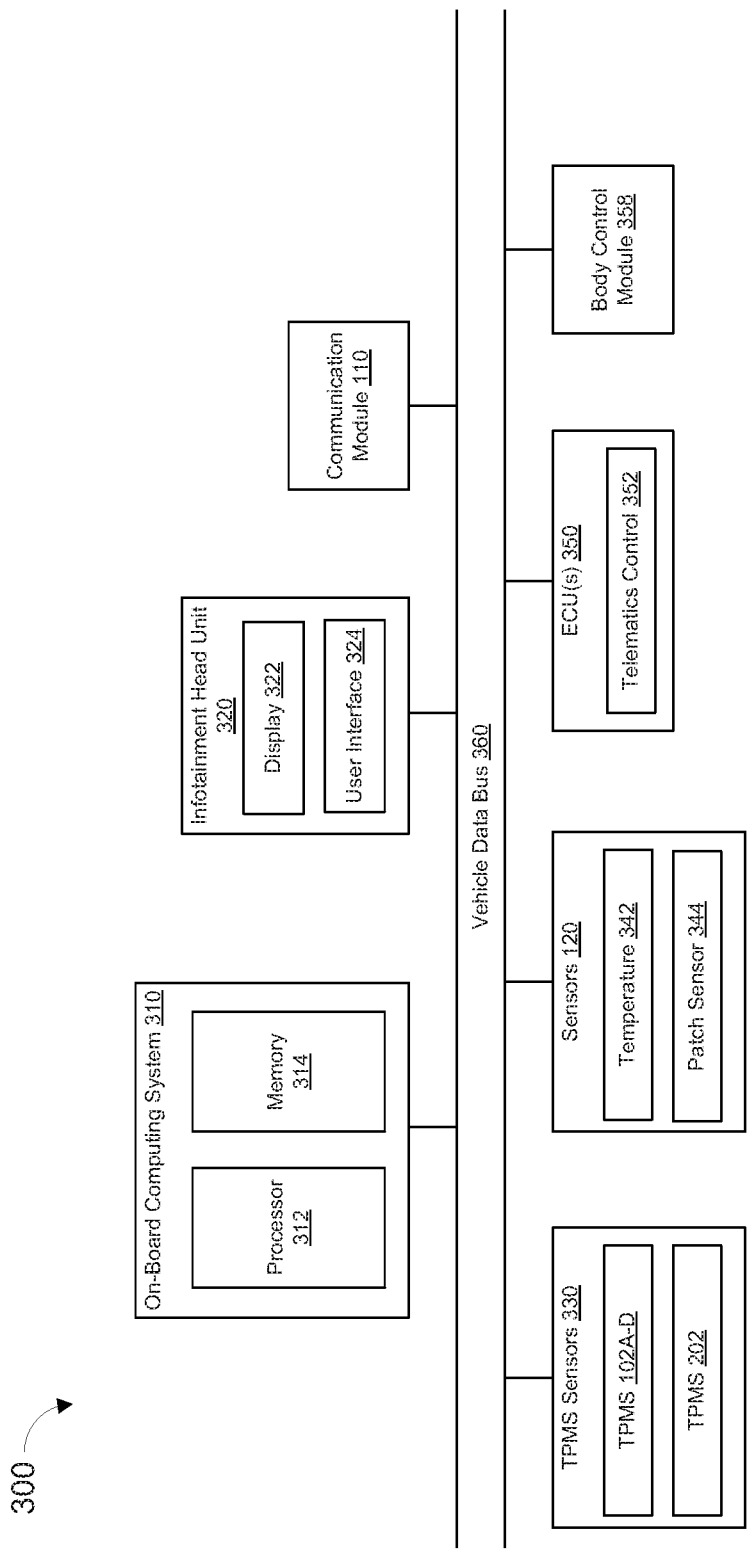
FIG. 3 illustrates an example block diagram of electronic components of the vehicles of FIG. 1 and/or FIG. 2.

FIG. 3 illustrates an example block diagram 300 showing electronic components of vehicles 100 and/or 200, according to some embodiments. In the illustrated example, the electronic components 300 include the on-board computing system 310, infotainment head unit 320, communication module 110, TPMS sensors 330, vehicle sensors 120, electronic control unit(s) 350, body control module 358, and vehicle data bus 360.

The on-board computing system 310 may include a microcontroller unit, controller or processor 312 and memory 314. Processor 312 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 314 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 314 includes multiple kinds of memory, particularly volatile memory and non-volatile memory.

The memory 314 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 314, the computer readable medium, and/or within the processor 312 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any of one or more of the methods or operations disclosed herein. As used herein, the term "computer readable medium" is expressly defined to include any type of computer readable storage device and/or storage disk and to exclude propagating signals.

The infotainment head unit 320 may provide an interface between vehicle 100 and/or 200 and a user. The infotainment head unit 320 may include one or more input and/or output devices, such as display 322, and user interface 324. User interface 324 may include input and output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), or a BLE or Cellular Connected phone, and/or speakers. In the illustrated example, the infotainment head unit 320 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 320 may share a processor with on-board computing system 310. Additionally, the infotainment head unit 320 may display the infotainment system on, for example, a display 322 of vehicle 100.

TPMS sensors 330 may include the TPMS sensors 102A-D described with respect to FIG. 1, and TPMS sensor 202 described with respect to FIG. 2.

Vehicle sensors 120 may be arranged in and around the vehicle 100 in any suitable fashion. In the illustrated example, sensors 120 include temperature sensor 342 and patch sensor 344. Other sensors are possible as well.

The ECUs 350 may monitor and control subsystems of vehicle 100 and/or 200. ECUs 350 may communicate and exchange information via vehicle data bus 360. Additionally, ECUs 350 may communicate properties (such as, status of the ECU 350, sensor readings, control state, error and diagnostic codes, etc.) to and/or receive requests from other ECUs 350. Some vehicles may have seventy or more ECUs 350 located in various locations around the vehicle communicatively coupled by vehicle data bus 360. ECUs 350 may be discrete sets of electronics that include their own circuit(s) (such as integrated circuits, microprocessors, memory, storage, etc.) and firmware, sensors, actuators, and/or mounting hardware. In the illustrated example, ECUs 350 may include the telematics control unit 352.

The telematics control unit 352 may control tracking of the vehicle 100, for example, using data received by a GPS receiver, communication module 110, and/or one or more sensors. The body control unit module 358 may be configured to receive input from a user, manufacturer, dealership, trailer rental outlet, or other party corresponding to one or more target pressures of the vehicle tires and/or trailer tires.

Vehicle data bus 360 may include one or more data buses that communicatively couple the on-board computing system 310, infotainment head unit 320, communication module 110, TPMS sensors 330, vehicle sensors 120, ECUs 350, body control module 358, and other devices or systems connected to the vehicle data bus 360. In some examples, vehicle data bus 360 may be implemented in accordance with the controller area network (CAN) bus protocol as defined by International Standards Organization (ISO) 11898-1. Alternatively, in some examples, vehicle data bus 360 may be a Media Oriented Systems Transport (MOST) bus, or a CAN flexible data (CAN-FD) bus (ISO 11898-7). In some examples, the CAN bus may be shared with the CAN-FD bus.

Figure 4:
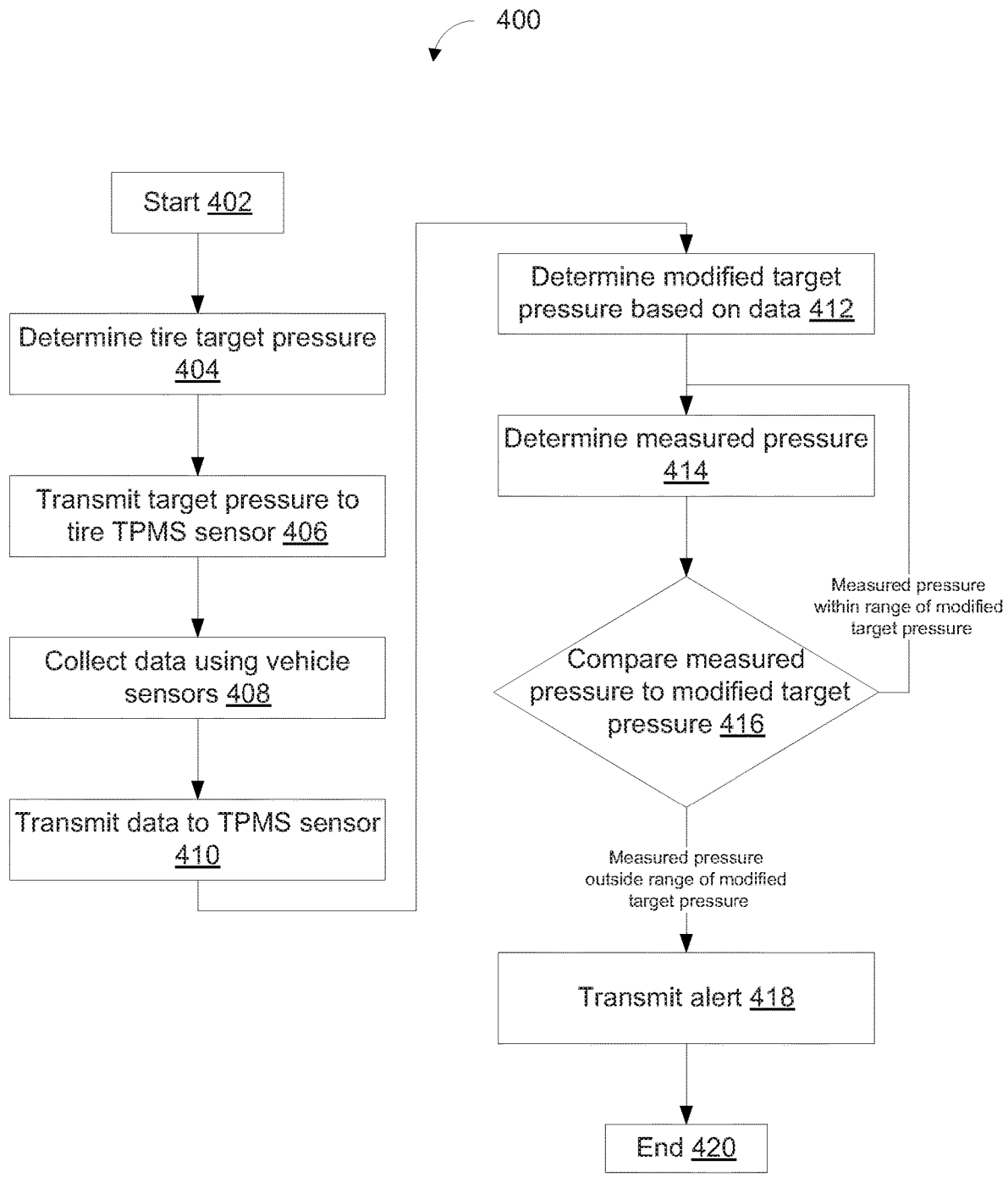
FIG. 4 illustrates a flowchart of an example method according to embodiments of the present disclosure.

FIG. 4 illustrates a flowchart of an example method 400 according to embodiments of the present disclosure. Method 400 may allow one or more TPMS sensors determine tire pressure, compare to a target pressure modified based on vehicle sensor data, and transmit an alert only when the measured pressure differs from the modified target pressure by greater than a threshold amount. The flowchart of FIG. 4 is representative of machine readable instructions that are stored in memory (such as a memory of a TPMS sensor and/or memory 314) and may include one or more programs which, when executed by a processor (such as a processor of the TPMS sensor and/or processor 312) may cause vehicle 100, vehicle 200, and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include determining a tire target pressure. This may include determining a single pressure value, or may include determining a range of tire pressure for which the tire is intended or expected to operate.

At block 406, method 400 may include transmitting the target pressure to the TPMS sensor of the tire. In some examples, this may be done via a communication module of the vehicle. Alternatively, the target pressure value may be preprogrammed into the TPMS sensor by the manufacturer, dealership, tire store, trailer rental outlet, or one or more other parties. Further, the allowable tolerance for deviation from the target pressure value may be loaded into the tire or the loaded value may already have target placard pressure less the allowable tolerance (ex., placard value less 3 PSI).

At block 408, method 400 may include collecting data using one or more vehicle sensors. This may include one or more vehicle sensors such as temperature sensors, load sensors, and others detecting various driving conditions, vehicle conditions, ambient conditions, and more.

At block 410, method 400 may include transmitting this data to the TPMS sensor. The data may be transmitted directly from the vehicle sensors to the TPMS sensor, or may be transmitted via the communication module. At block 412, method 400 may include the TPMS sensor determining a modified target pressure based on the vehicle sensor data. This may include applying a correction factor to the target pressure based on the vehicle sensor data.

At block 414, method 400 may include determining the tire pressure of the tire corresponding to the TPMS sensor. Block 416 may then include comparing the measured pressure to the modified target pressure.

If the measured pressure is within a threshold range of the modified target pressure, method 400 may proceed back to block 414 to measure the pressure again, in some cases after a small delay.

But if the measured pressure is outside a threshold range of the modified target pressure, method 400 may continue to block 418. Block 418 may include transmitting an alert from the TPMS sensor that alerts the communication system that the pressure is outside the threshold range. The alert can then be used to make a vehicle driver aware that the tire pressure is not optimal. In some instances, the alert may also be sent to an admin via the Telematics module 352. Method 400 may then end at block 420.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a tire;
a TPMS sensor corresponding to the tire; and
a processor in communication with the TPMS sensor and configured to:
receive a target pressure;
dynamically determine a correction factor to modify the target pressure based on vehicle data determined by a vehicle sensor; and
responsive to determining that a measured pressure differs from the modified target pressure by a threshold amount, transmit an alert.

2. The vehicle of claim 1, wherein the vehicle sensor comprises a temperature sensor, and wherein the processor is further configured to receive a tire temperature value determined by the temperature sensor.

3. The vehicle of claim 1, wherein the vehicle sensor comprises a patch sensor, and wherein the processor is configured to receive a load value of the tire determined by the patch sensor.

4. The vehicle of claim 1, wherein the processor is configured to transmit the alert at predetermined intervals, indicating a health of the TPMS sensor.

5. The vehicle of claim 1, further comprising a trailer, wherein the tire comprises a trailer tire.

6. The vehicle of claim 1, wherein the tire comprises a first tire having a first target pressure, and wherein the vehicle further comprises a second tire having a second target pressure that is different from the first target pressure.

7. The vehicle of claim 1, further comprising a body control module, wherein the processor is configured to automatically update the target pressure based on user input received by the body control module.

8. The vehicle of claim 1, wherein the processor is configured to:
receive a plurality of tire pressure values; and
determine the modified target pressure by selecting one of the plurality of tire pressure values.

9. A system comprising:
a vehicle;
a trailer attachable to the vehicle;
a trailer tire;
a TPMS sensor corresponding to the trailer tire; and
a processor in communication with the TPMS sensor and configured to:
receive a target pressure;
dynamically determine a correction factor to modify the target pressure based on trailer data determined by a trailer sensor; and
responsive to determining that a measured pressure differs from the modified target pressure by a threshold amount, transmit an alert to the vehicle.

10. A method comprising:
receiving, by a processor, a target pressure corresponding to a tire of a vehicle;
dynamically determining, by the processor, a correction factor to modify the target pressure based on vehicle data determined by a vehicle sensor; and
transmitting, by the processor and responsive to determining that a measured pressure differs from the modified target pressure by a threshold amount, an alert.

11. The method of claim 10, wherein the vehicle sensor comprises a temperature sensor, the method further comprising:
receiving, by the processor, a tire temperature value determined by the temperature sensor.

12. The method of claim 10, wherein the vehicle sensor comprises a patch sensor, the method further comprising:
receiving, by the processor, a load value of the tire determined by the patch sensor.

13. The method of claim 10, further comprising:
transmitting the alert at predetermined intervals.

14. The method of claim 10, wherein the tire comprises a trailer tire of a trailer coupled to the vehicle.

15. The method of claim 10, wherein the tire comprises a first tire of a plurality of tires of the vehicle, the first tire having a first target pressure that is different from a second target pressure corresponding to a second tire of the plurality of tires of the vehicle.

16. The method of claim 10, further comprising:
receiving user input to a body control module of the vehicle; and
automatically updating the target pressure based on the user input.

17. The method of claim 10, further comprising:
receiving, by the processor, a plurality of tire pressure values; and
determining, by the processor, the modified target pressure by selecting one of the plurality of tire pressure values.

* * * * *